United States Patent
Feldmann et al.

(10) Patent No.: US 7,412,884 B2
(45) Date of Patent: Aug. 19, 2008

(54) UNBALANCE MEASURING DEVICE AND METHOD FOR UNBALANCE MEASUREMENT

(75) Inventors: Dagmar Feldmann, Schwabenheim (DE); Dieter Thelen, Modautal (DE); Hans-Peter Körber, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 407 days.

(21) Appl. No.: 10/552,293

(22) PCT Filed: Apr. 3, 2004

(86) PCT No.: PCT/DE2004/000697

§ 371 (c)(1), (2), (4) Date: Sep. 30, 2005

(87) PCT Pub. No.: WO2004/092699

PCT Pub. Date: Oct. 28, 2004

(65) Prior Publication Data

US 2006/0266115 A1    Nov. 30, 2006

(30) Foreign Application Priority Data

Apr. 10, 2003 (DE) .................. 103 16 767

(51) Int. Cl.
    *G01M 1/16* (2006.01)
(52) U.S. Cl. .................................. 73/462
(58) Field of Classification Search ............ 73/462
    See application file for complete search history.

(56) References Cited

U.S. PATENT DOCUMENTS

| | | | |
|---|---|---|---|
| 1,486,115 A | | 3/1924 | Allen |
| 2,402,205 A | | 6/1946 | Phelps |
| 2,758,487 A | | 8/1956 | Erickson |
| 3,071,972 A | * | 1/1963 | Koenig .................. 73/462 |
| 3,079,802 A | * | 3/1963 | Fibikar et al. .......... 73/466 |
| 3,091,332 A | * | 5/1963 | Parker .................. 209/544 |
| 3,483,756 A | * | 12/1969 | Merrill .................. 73/457 |
| 3,854,339 A | * | 12/1974 | Muller .................. 73/462 |
| 4,428,225 A | * | 1/1984 | Kato et al. ............ 73/65.01 |
| 4,543,825 A | | 10/1985 | Schönfeld |
| 5,255,566 A | * | 10/1993 | Okumura .............. 73/660 |
| 5,406,846 A | | 4/1995 | Gasch et al. |
| 6,657,341 B2 | * | 12/2003 | Trionfetti .............. 310/90 |

FOREIGN PATENT DOCUMENTS

| | | |
|---|---|---|
| DE | 24 33 624 A | 3/1975 |
| DE | 78 28 842 U1 | 9/1978 |
| DE | 35 41 959 A1 | 6/1986 |
| DE | 195 24 167 A | 1/1996 |

(Continued)

*Primary Examiner*—Hezron E. Williams
*Assistant Examiner*—Samir M. Shah
(74) *Attorney, Agent, or Firm*—Collard & Roe, P.C.

(57) ABSTRACT

In the case of an imbalance measuring device with a bearing device for static fluid bearing of the rotor (1), to improve the balance quality and to shorten the required time for balancing, it is proposed that the bearing device has at least two open, fluid-supplied bearing shells (11, 11') to receive sections of the rotor periphery and at least one bearing plate (12, 12') which is assigned to a rotor end surface and supplied with fluid. The drive is decoupled from the rotor (1) during the imbalance measuring process, and the measuring process preferably takes place during time-variable rotary behavior of the rotor (1).

5 Claims, 2 Drawing Sheets

FOREIGN PATENT DOCUMENTS

| | | |
|---|---|---|
| DE | 44 41 951 C2 | 5/1996 |
| DE | 44 41 954 C2 | 5/1996 |
| EP | 0 104 266 A1 | 4/1984 |
| EP | 0 508 683 | 10/1992 |
| EP | 0 590 169 A1 | 4/1994 |
| EP | 1 180 846 A | 2/2002 |
| FR | 1 443 480 A | 9/1966 |

* cited by examiner

UNBALANCE MEASURING DEVICE AND METHOD FOR UNBALANCE MEASUREMENT

CROSS REFERENCE TO RELATED APPLICATIONS

Applicants claim priority under 35 U.S.C. §119 of German Application No. 103 16 767.6 filed Apr. 10, 2003. Applicants also claim priority under 35 U.S.C. 365 of PCT/DE2004/ 000697 filed Apr. 3, 2004. The international application under PCT article 21(2) was not published in English.

BACKGROUND OF THE INVENTION

1. Field of the Invention

The invention relates to an imbalance measuring device for rotors, with essentially one bearing device for static fluid bearing for a rotatable rotor, one device to change the rotary behavior of the rotor, at least one measuring transducer which captures the effects of the imbalance of the rotor in a measuring process, one device to generate a reference signal, and one evaluation device for the signals which the measuring transducer supplies using the reference signal, and methods for imbalance measurement.

2. The Prior Art

A rotor which has bearing possibilities on its outer periphery, e.g. such as are formed by the bearing journals of an electrical armature, can be balanced precisely with reference to these bearing positions. An aerostatic bearing of such a rotor has therefore not been used until now.

However, higher demands are constantly made on the balance quality of, in particular, fast-running small rotors such as electrical armatures, turbine rotors, etc. An additional requirement is the minimisation of cycle times in the manufacturing process, particularly for operations associated with the balancing of rotors.

SUMMARY OF THE INVENTION

According to the invention, the object is achieved with an imbalance measuring device of the type mentioned at the outset in that the bearing device has at least two open, fluid-supplied bearing shells to receive sections of the rotor periphery and at least one bearing plate which is assigned to a rotor end surface, rigidly supported and supplied with fluid, in that a device to capture the rotary behavior of the rotor is provided, and in that the device to change the rotary behavior is decoupled from the rotor during the measuring process, and the measuring process takes place with rotary behavior which is constant or preferably variable over time. Regarding the method, the object is achieved by supporting the rotor in a precise position in at least two aerostatic bearings in the radial direction and in at least one aerostatic bearing in the axial direction and during the measuring process the rotational speed is kept constant or the rotary behavior of the rotor is not influenced and the measuring process takes place with time-variable rotary behavior.

According to the invention, in the case of the imbalance measuring device in this form, it is provided that the rotor is supported in both the axial direction and the radial direction in easily accessible fluid bearings using gas or air or a gas or air mixture, i.e. aerostatically, and additionally, the accelerating or decelerating drive is decoupled from the rotor during the imbalance measuring process, whereby the measuring device is executed with rotary behavior which changes over time, e.g. during coasting, or rotary behavior which is constant over time. The support of a rotor face in the axial direction on fluid-supplied bearing plate surfaces that are assigned to the rotor face results, even in the case of a horizontally arranged rotor axis, in a very precise bearing position of the rotor in the axial direction, since because of the formation of a pressure distribution in the flow, similar to that in a radial diffuser, fluidically the rotor bearing position is fixed against the bearing plate. The join between the bearing plate and its holding structure is executed with high rigidity, to avoid oscillation in the rotor axial direction, e.g. self-stimulated oscillation. The invention is based on the recognition that the desired highly precise measurement can only be achieved within a very short time by combining these actions. With the invention, the rotor is supported and measured freely of interfering forces and moments, and thus a considerably better measurement result is achieved than in the traditional way.

Determining the imbalance of the rotor in the case of an inconstant measured rotational speed is already known from EP 0 590 169 A1, but no indications can be taken from this publication about supporting the and allowing it to rotate rotor in the way according to the invention.

A further version of the invention provides that the bearing shells are arranged exchangeably on bearing devices, and that the bearing device has a fluid supply system, which makes possible a fluid-proof joining of, in particular, bearing shells which are to be exchanged and have different fluid channels, so that an advantageous standardization of the bearing device and/or a modular construction of the imbalance measuring device is given. This also applies to a proposal according to which it is provided that the bearing plate is arranged exchangeably on the bearing device or a component, which cannot oscillate, of the imbalance measuring device, and that the bearing device or component has a fluid supply system, which makes possible a fluid-proof joining of, in particular, bearing plates which are to be exchanged and have different fluid channels. Advantageously, a common fluid supply system for fluid supply to both the bearing shells and the bearing plate can be used. The bearing plate can be arranged on a part of the imbalance measuring device in which oscillation is induced by imbalance, such as the bearing stanchion or bearing bracket, or on a component which is not subject to oscillation induced by imbalance, e.g. the frame.

Supporting the rotor in a defined position is significantly simplified by the arrangement of two bearing plates, between which the rotor is arranged with its faces. The precise fixing of the position of the rotor in the axial direction is done fluidically via the fluid which flows out on the bearing surface of a bearing plate into the space between bearing plate and face.

Designing the device to change the rotary behavior as a belt drive, the belt of which can be put on at two essentially opposite rotor positions, is also advantageous since because of it, during acceleration or braking of the rotor only small transverse forces act on the rotor, and can hardly affect the aerostatic bearing.

The proposal to provide the belt drive with a V-shaped area with changeable included angle, within which the rotor is arranged, has advantages regarding space and operation to put the belt on the rotor or to swivel it away. For this purpose, simple fluid-operated or electrically operated positioning devices can be used, and their positioning movement can also easily be automated.

DETAILED DESCRIPTION OF PREFERRED EMBODIMENTS

Figure 1:
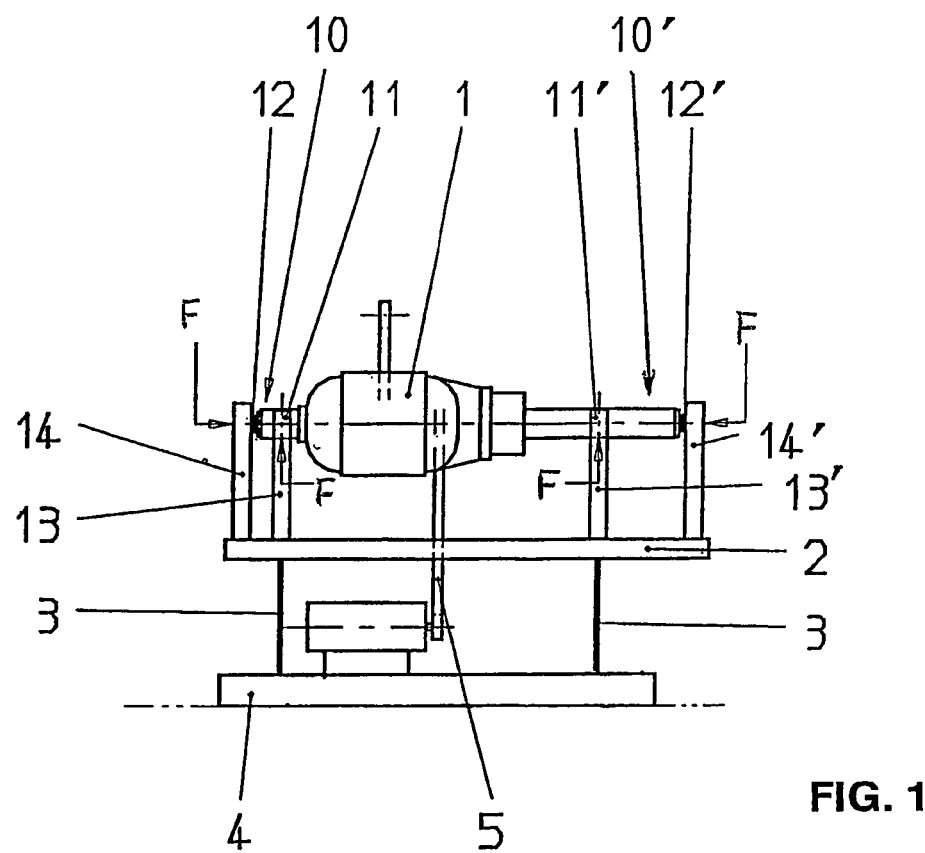
FIG. 1 shows an imbalance measuring device according to the invention, in schematic representation.

The oscillating bridge 2 is supported in the usual way via, e.g., four supporting springs 3 so that it can oscillate against the frame 4 of the imbalance measuring device. The rotor 1 is put into rotation, or braked after the measuring process, by a belt drive 5. Imbalance-induced oscillation of the oscillating bridge 2 is measured by at least one sensor 6 and used to determine the imbalance to be balanced on the rotor 1. During the measuring process, the belt drive 5 is decoupled from the rotor 1.

The bearing device is designed to support the rotor with horizontal axial direction, and has bearing components for two bearing positions 10, 10', which in the shown example are provided on the two end bearing journals of the electrical armature. To support the rotor 1 in the vertical direction, one open, semicylindrical bearing shell 11, 11' is provided at each end. The bearing shell 11, 11' has fluid channels 21, 21', which open on its semicylindrical bearing surfaces and are used to feed gas or air or a gas or air mixture to the aerostatic bearing. To support the rotor 1 in the horizontal direction, a bearing plate 12, 12' is assigned to each of the two end surfaces of the rotor 1. The bearing plate 12, 12' has fluid channels, which open on its bearing surface and are used to feed gas or air or a gas or air mixture to the aerostatic bearing.

The bearing surface of the bearing plate 12, 12' is in a form which is complementary to the associated end surface of the rotor 1. In the case of a rotor end in slightly convex form, the bearing plate 12, 12' has a correspondingly shaped indentation; in the case of a flat end surface, the bearing plate 12, 12' has a flat bearing surface. The outflow openings (not shown) of the fluid channels in the bearing surface are arranged so that the fluid which flows out preferably parallel to the axial direction does not touch the area of a central bore hole which may be present in the rotor end. The bearing surface on the face of the rotor is therefore always opposite the outflow openings in the bearing surface of the bearing plate. Fluidically, this has the effect of fixing and binding the face of the rotor to or on the bearing surface of the bearing plate, and thus ensuring a precise rotor bearing position in the axial direction.

The two bearing plates 12, 12' and the two bearing shells 11, 11' can be supplied by a common fluid supply, as is shown in FIG. 1 by the conduit sections which are shown symbolically and marked with F. Different conditions regarding the vertical and horizontal support of the rotor 1 can be taken into account fluidically by, for instance, choke points in the fluid channels.

Figure 3:
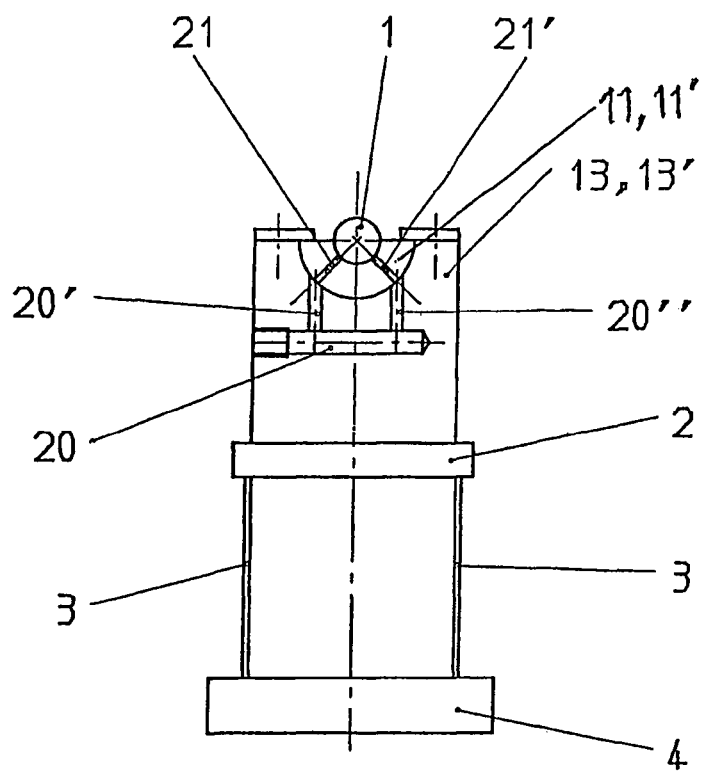
FIG. 3 shows a bearing area of the imbalance measuring device, in schematic representation.

To adapt to different rotor types, both the bearing shells 11, 11' and the bearing plates 12, 12' are exchangeably fixed to bearers 13, 13' and 14, 14', which are arranged on the bearing bracket 2. The bearers 13, 13', 14, 14' have fluid conduits 20, which are in such a form that their openings fit together in a sealed manner with the openings of the fluid channels 21, 21' of differently formed bearing shells 11, 11' and differently formed bearing plates 12, 12' respectively, as can be seen more clearly in FIG. 3. In a standard component, namely the bearer 13, 13' which is fixed to the bearing bracket 2, a fluid conduit 20 with two branches 20', 20" is provided, which branches are assigned to two fluid channels 21, 21' in the semicylindrical bearing shell 11, 11' in a fluid-proof way. In a way which is not shown in more detail, a further standard component is formed correspondingly, as the bearer 14, 14' for the appropriate bearing plate 12, 12'.

Figure 2:
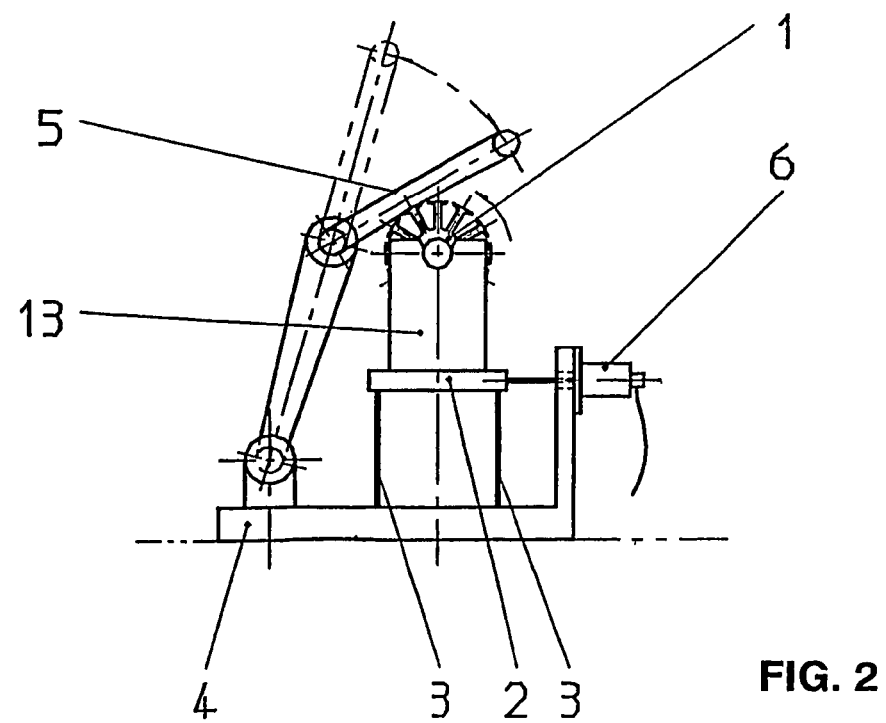
FIG. 2 shows a side view of the imbalance measuring device according to FIG. 1.

To drive or brake the rotor 1, a belt drive 5 is used. In FIG. 2, an embodiment in which the drive belt can be put on tangentially to the rotor periphery can be seen.

Figure 4:
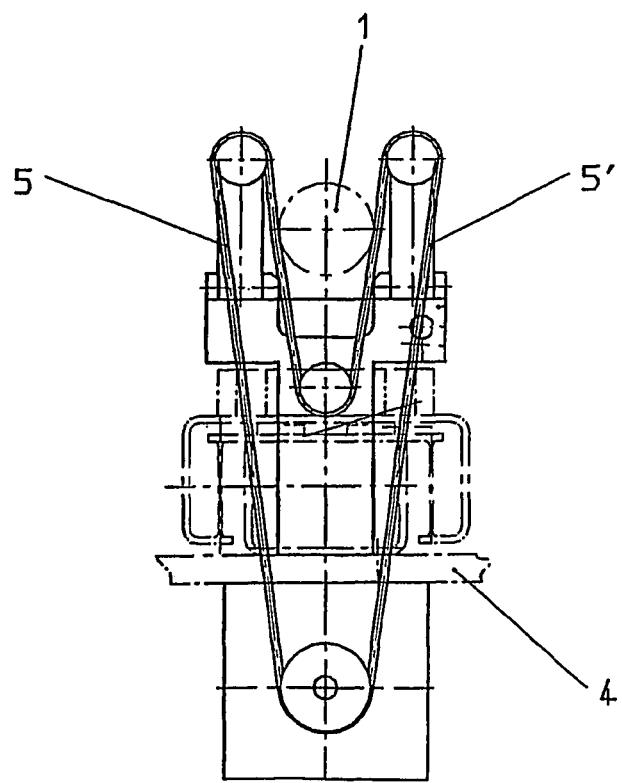
FIG. 4 shows a belt drive to speed up or brake a rotor to be balanced.

In the embodiment shown in FIG. 4, the drive belt can be put onto two approximately opposite surfaces of the rotor periphery, which means a more even load regarding the stress on the aerostatic bearing. For this purpose, the belt drive 5 has a V-shaped section 5', inside which the rotor 1 is arranged. The two legs of the V-shaped section 5' can be swivelled for putting on or removal from the rotor periphery surface.

Instead of a belt drive 5, any other suitable drive can be used to speed up or brake the rotor 1, e.g. a magnetic drive or a drive using air or even a drive which can be connected with positive locking. What is essential to the invention is that the drive for the measuring process can be decoupled, so that the rotor 1 rotates freely of disturbing forces and moments. The measurement can be done in the case of time-constant or time-variable rotary behavior of the rotor, which makes possible the use of differently equipped measuring and evaluation devices possible. If the measurement is be done with time-constant rotary behavior, the rotor is kept at a constant rotational speed by a drive which applies no disturbing forces and moments to the rotor, e.g. an air jet.

As an alternative to support on an oscillating bridge 2, the rotor 1 can also be supported radially on, for instance, two axially separated bearing stanchions. The upper part of each bearing stanchion, where the bearing shell is, is supported via elastic elements on the frame of the imbalance measuring device, so that the upper part can perform imbalance-induced oscillations with the bearing shell. The axial support can be joined to the upper part of the bearing stanchion, but alternatively arranged non-resonantly on the frame of the imbalance measuring device.

The invention claimed is:

1. An imbalance measuring device for a rotatable rotor having a rotary behavior, with a bearing device as a static fluid bearing for the rotor, a device to change the rotary behavior of the rotor, at least one measuring transducer which supplies signals and captures the effects of the imbalance of the rotor in a measuring process, a device to generate a reference signal, and an evaluation device for the signals which the measuring transducer supplies using the reference signal, wherein the bearing device has at least two open, fluid-supplied bearing shells to receive sections of the rotor periphery and at least one bearing plate which is assigned to an end surface of the rotor, rigidly supported and supplied with fluid, wherein a device to capture the rotary behavior of the rotor is provided, wherein the device to change the rotary behavior is decoupled from the rotor during the measuring process that takes place with rotary behavior which is constant or variable over time, and wherein the bearing shells are arranged exchangeably on the bearing device, and the bearing device has a fluid supply system, which makes possible a fluid-proof joining of the bearing shells which are to be exchanged, and have different fluid channels to the bearing device.

2. The imbalance measuring device according to claim 1, wherein two rigidly supported and binding, fluid-supplied bearing plates which enclose the two rotor end surfaces between them are provided.

3. The imbalance measuring device according to claim 1, wherein the device to change the rotary behavior is a belt drive (5), the belt of which can be put on at two substantially opposite rotor positions.

4. The imbalance measuring device according to claim 3, wherein the belt drive has a V-shaped area with a changeable included angle, within which the rotor is arranged.

5. An imbalance measuring device for a rotatable rotor having a rotary behavior, with a bearing device as a static fluid bearing for the rotor, a device to change the rotary behavior of the rotor, at least one measuring transducer which supplies signals and captures the effects of the imbalance of the rotor in a measuring process, a device to generate a reference signal, and an evaluation device for the signals which the measuring transducer supplies using the reference signal, wherein the bearing device has at least two open, fluid-supplied bearing shells to receive sections of the rotor periphery and first and second bearing plates, each bearing plate assigned to a respective end surface of the rotor, rigidly supported and supplied with fluid, wherein a device to capture the rotary behavior of the rotor is provided, wherein the device to change the rotary behavior is decoupled from the rotor during the measuring process that takes place with rotary behavior which is constant or variable over time, and wherein the first and second bearing plates are arranged exchangeably on the bearing device or a component, which cannot oscillate, of the imbalance measuring device, and the bearing device or component has a fluid supply system, which makes possible a fluid-proof joining of the bearing plates which are to be exchanged, and have different fluid channels, to the bearing device or component.

* * * * *